US006768950B2

(12) United States Patent
Bugarin et al.

(10) Patent No.: US 6,768,950 B2
(45) Date of Patent: *Jul. 27, 2004

(54) REMOTE CORIOLIS FLOWMETER SIZING AND ORDERING SYSTEM

(75) Inventors: John R. Bugarin, Fort Collins, CO (US); James F. Mackin, III, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,032

(22) Filed: Jun. 5, 2003

(65) Prior Publication Data

US 2003/0204335 A1 Oct. 30, 2003

Related U.S. Application Data

(63) Continuation of application No. 09/725,550, filed on Nov. 29, 2000, now Pat. No. 6,606,570.

(51) Int. Cl.[7] ............................. G01F 1/00; G01F 17/60
(52) U.S. Cl. .......................................... 702/45; 705/26
(58) Field of Search ............................ 702/45, 50, 100, 702/188; 705/22, 26–28

(56) References Cited

U.S. PATENT DOCUMENTS

| 5,687,100 | A | * | 11/1997 | Butler et al. ................. 702/137 |
| 6,282,518 | B1 | * | 8/2001 | Farrell et al. .................. 705/26 |
| 6,343,517 | B1 | * | 2/2002 | Van Cleve et al. ..... 73/861.357 |
| 6,487,507 | B1 | * | 11/2002 | Mansfield et al. ............ 702/45 |
| 6,606,570 | B2 | * | 8/2003 | Bugarin et al. ............... 702/45 |

FOREIGN PATENT DOCUMENTS

| WO | WO/00/46706 | 8/2000 |
| WO | WO/ 02/23425 A1 | 3/2002 |

* cited by examiner

*Primary Examiner*—Michael Nghiem
(74) *Attorney, Agent, or Firm*—Duft Setter Ollila & Bornsen LLC

(57) ABSTRACT

A system that provides remote ordering for a Coriolis flowmeter. The system is provided by a server. The server begins by receiving input flow stream parameters from a remote client computer. The server then determines flowmeter parameters from the input flow stream parameters received from the remote client computer. The server then determines at least one model of flowmeter suitable for the flowmeter parameters. The suitable models of flowmeters are then transmitted to a remote computer where a customer may then place an order for one of the models suitable for the flowmeter parameters.

18 Claims, 5 Drawing Sheets

REMOTE CORIOLIS FLOWMETER SIZING AND ORDERING SYSTEM

RELATED APPLICATIONS

This application is a continuation of a U.S. patent application Ser. No. 09/725,550, filed Nov. 29, 2000, entitled "Remote Coriolis Flowmeter Sizing and Ordering System", now U.S. Pat. No. 6,606,570, which is incorporated herein by reference.

FIELD OF THE INVENTION

This invention relates to Coriolis mass flowmeters. More particularly, this invention relates to a computer system for receiving customer orders of Coriolis flowmeters. Still more particularly, this invention relates to a system executed by a server which a customer may access from a remote system and input desired flow parameters and be given choices of Coriolis mass flowmeters to select from to order.

Problem

A Coriolis mass flowmeter measures mass flow and other information of materials flowing through a conduit in the flowmeter. Exemplary Coriolis flowmeters are disclosed in U.S. Pat. No. 4,109,524 of Aug. 29, 1978, U.S. Pat. No. 4,491,025 of Jan. 1, 1985, and U.S. Pat. No. Re. 31,450 of Feb. 11, 1982, all to J. E. Smith et al. These flowmeters have one or more conduits of straight or curved configuration. Each conduit configuration has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The material flowing through the pipeline may be gas, liquid, solid, and any combination of these three. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset. As material begins to flow, Coriolis forces cause each point along the conduit to have a different phase. The phase on the inlet side of the conduit lags the driver, while the phase on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

There are many different models of Coriolis flowmeters. Micro Motion Inc. of Boulder, Colo., markets many types of Coriolis flowmeters. It is a problem for a user to determine a proper model of Coriolis flowmeter to be used in measuring mass flow rates through a pipeline.

In order to determine the flowmeter model of the proper size and parameters for a pipeline, flow stream parameters for the pipeline must be known. Flow stream parameters include material flow rate, material density, material viscosity, material temperature, and material operating pressure. From these flow stream parameters, parameters for a flowmeter to insert into the pipeline can be determined. Flowmeter parameters include meter accuracy, pressure loss, and material velocity. The flowmeter parameters and flow stream parameters are used to determine the models of flowmeters that can be used to measure mass flow rate in the pipeline.

It is common to use software programs executed by a computer to determine the proper model. However, this requires that meter selection and sizing occur on premises where the computer executing the software resides. Heretofore, there has been no way for a user to log onto a computer to remotely access sizing software and order a desired flowmeter without the intervention of a human operator.

Solution

The above and other problems are solved and an advance in the art is made by a remote sizing and ordering system for a Coriolis flowmeter in accordance with this invention. The present invention allows a user to log in via a network connection. The network connection may either be via a modem, via Internet, via intranet, or any other network connection. The user may then order a flowmeter that fits specification for the pipeline into which the flowmeter is to be inserted. This allows the user to order at any time of day and from anywhere in the world.

In accordance with this invention, a method is provided for remote ordering and configuring of a flowmeter. For the method, a server connects to a computer used by a user that is remotely located from the server. The computer communicates with the server over a network, such as the Internet. The server receives input flow stream parameters from the computer. The server determines flowmeter parameters from the input flow stream parameters. The server determines whether one of the flowmeters is suitable for the flowmeter parameters. The server transmits information on the flowmeters to the computer over the network. The computer displays the flowmeter information to the user. The server receives a selection of one of the flowmeters by the user. The server receives the selection from the computer over the network. The server transmits an order for the selected flowmeter.

The server may transmit a display to the remote computer of configuration options. The user then selects the configuration options and transmits the selected options to the server. The server receives the configuration options from the user. Some of the configuration options include a process connection type, the process connection size, a power supply type which may include either Alternating Current (AC) or Direct Current (DC), and whether to have a local display.

The server may receive the following input flow stream parameters; a flow rate of material, a density of material, a viscosity of material, a temperature of material, and a material operating pressure. The server calculates the following flowmeter parameters from the input flow stream parameters; meter accuracy, pressure loss and fluid velocity.

After the user has configured a flowmeter, the flowmeter configuration may be stored in an electronic shopping cart. The customer then places an order for a flowmeter from configured flowmeters in the shopping cart. The server generates a message and transmits the order to a manufacturing department that produces and ships the flowmeter to the customer.

BRIEF DESCRIPTION OF THE DRAWINGS

The above and other features of this invention described in the Detailed Description below and the following drawings.

DETAILED DESCRIPTION

Figure 1:
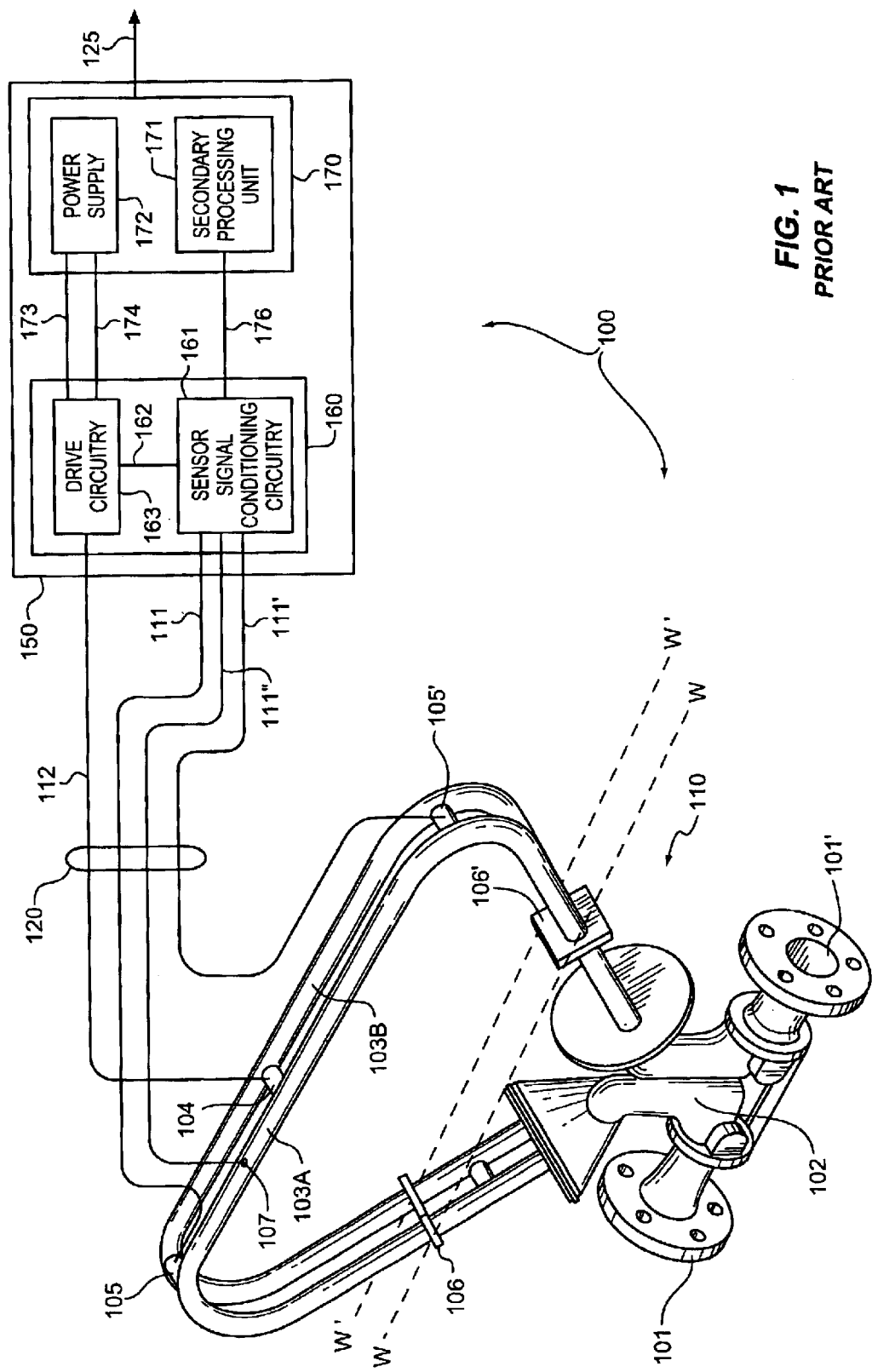
FIG. 1 illustrating an exemplary Coriolis Effect mass flowmeter.

The present invention relates to a system for providing remote ordering and sizing for a Coriolis flowmeter. FIG. 1 illustrates an exemplary Coriolis flowmeter that may provide a mass flow rate or other process parameter. Coriolis flowmeter 100 includes a flowmeter assembly 110 and meter electronics 150. Meter electronics 150 are connected to a meter assembly 110 via leads 120 to provide for example, but not limited to, density, mass-flow-rate, volume-flow-rate, and totalized mass-flow rate information over a path 125.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by Coriolis mass flowmeters.

Meter assembly 110 includes a pair of flanges 101 and 101', manifold 102 and conduits 103A and 103B. Driver 104, pick-off sensors 105 and 105', and temperature sensor 107 are connected to conduits 103A and 103B. Brace bars 106 and 106' serve to define the axis W and W' about which each conduit oscillates.

When Coriolis flowmeter 100 is inserted into a pipeline system (not shown) which carries the process material that is being measured, material enters flowmeter assembly 110 through flange 101, passes through manifold 102 where the material is directed to enter conduits 103A and 103B. The material then flows through conduits 103A and 103B and back into manifold 102 from where it exits meter assembly 110 through flange 101'.

Conduits 103A and 103B are selected and appropriately mounted to the manifold 102 so as to have substantially the same mass distribution, moments of inertia and elastic modules about bending axes W—W and W'—W', respectively. The conduits 103A–103B extend outwardly from the manifold in an essentially parallel fashion.

Conduits 103A–103B are driven by driver 104 in opposite directions about their respective bending axes W and W' at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 150 to driver 104 via path 112.

Pick-off sensors 105 and 105' are affixed to at least one of conduits 103A and 103B on opposing top ends of the conduit to measure oscillation of the conduits. As the conduit 103A–103B vibrates, pick-off sensors 105–105' generate first and second pick-off signals. The first and second pick-off signals are applied to paths 111 and 111'. The driver signal is applied to path 112.

Temperature sensor 107 is affixed to at least one conduit 103A and/or 103B. Temperature sensor 107 measures the temperature of the conduit to modify equations for the temperature of the system. Path 111" carries temperature signals from temperature sensor 107 to meter electronics 150.

Meter electronics 150 receives the first and second pick-off signals on paths 111 and 111', respectively. Meter electronics 150 processes the first and second velocity signals to compute the mass flow rate, the density, or another property of the material passing through flowmeter assembly 110. This computed information is applied by meter electronics 150 over path 125 to a utilization means (not shown).

It is known to those skilled in the art that Coriolis flowmeter 100 is similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only a single feedback signal since a density measurement requires only the measurement of frequency and a phase measurement is not necessary. The descriptions of the present invention herein apply equally to vibrating tube densitometers.

In Coriolis flowmeter 100, the meter electronics 150 are physically divided into 2 components, a host system 170 and a signal conditioner 160. In conventional meter electronics, these components are housed in one unit.

Signal conditioner 160 includes drive circuitry 163 and sensor signal conditioning circuitry 161. One skilled in the art will recognize that in actuality drive circuitry 163 and sensor signal conditioning circuitry 161 may be separate analog circuits or may be separate functions provided by a digital signal processor or other digital components. Drive circuitry 163 generates a drive signal and applies an alternating drive current to driver 104 via path 112 of path 120. The circuitry of the present invention may be included in drive circuitry 163 to provide an alternating current to driver 104.

Path 112 contains a first and a second lead. Drive circuitry 163 is communicatively connected to sensor signal conditioning circuitry 161 via path 162. Path 162 allows drive circuitry 163 to monitor the incoming pick-off signals to adjust the drive signal. Power to operate drive circuitry 163 and sensor signal conditioning circuitry 161 is supplied from host system 170 via a first path 173 and a second path 174. That may be a part of a conventional 2-wire, 4-wire cable, or a portion of a multi-pair cable.

Sensor signal conditioning circuitry 161 receives signals from first pick-off 105, second pick-off 105', and temperature sensor 107 via paths 111, 111' and 111". Sensor signal conditioning circuitry 161 determines the frequency of the pick-off signals and may also determine properties of a material flowing through conduits 103A–103B. After the frequency of the input signals from pick-off sensors 105–105' and properties of the material are determined, parameter signals carrying this information are generated and transmitted to a secondary processing unit 171 in host system 170 via path 176.

Host system 170 includes a power supply 172 and secondary processing unit 171. Power supply 172 receives electricity from a source and converts the received electricity to the proper power needed by the system. Secondary processing unit 171 receives the parameter signals from sensor signal conditioning circuitry 161 and may perform processes needed to provide properties of the material flowing through conduits 103A–103B needed by a user. Such properties may include but are not limited to density, mass flow rate, and volumetric flow rate.

Figure 2:
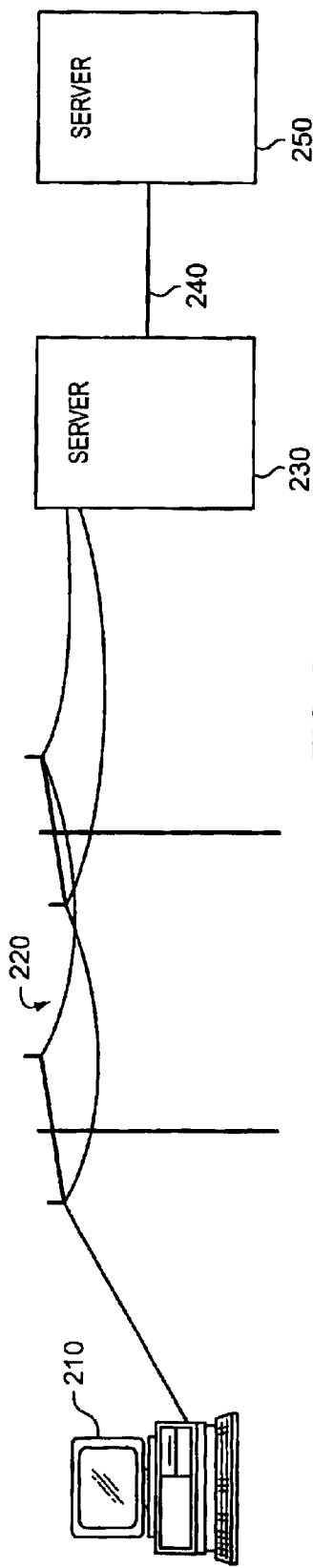
FIG. 2 illustrating a typical Internet connection.

FIG. 2 illustrates a typical Internet connection which may be used to embody the invention. In FIG. 2, remote client computer 210 is at a customer site. Remote client computer 210 uses a modem or other networking device to connect to server 230. If a modem is used, remote client computer 210 connects to telephone network 220 which provides a dial up connection to server 230. Server 230 is an Internet Service Provider (ISP) for remote client computer 210. Server 230 connects via Internet 240 to Server 250. One skilled in the art will appreciate that Internet 240 is a network of computers that are communicatively connected. Server 250 is a server of a provider of this invention that executes processes in accordance with this invention.

Figure 3:
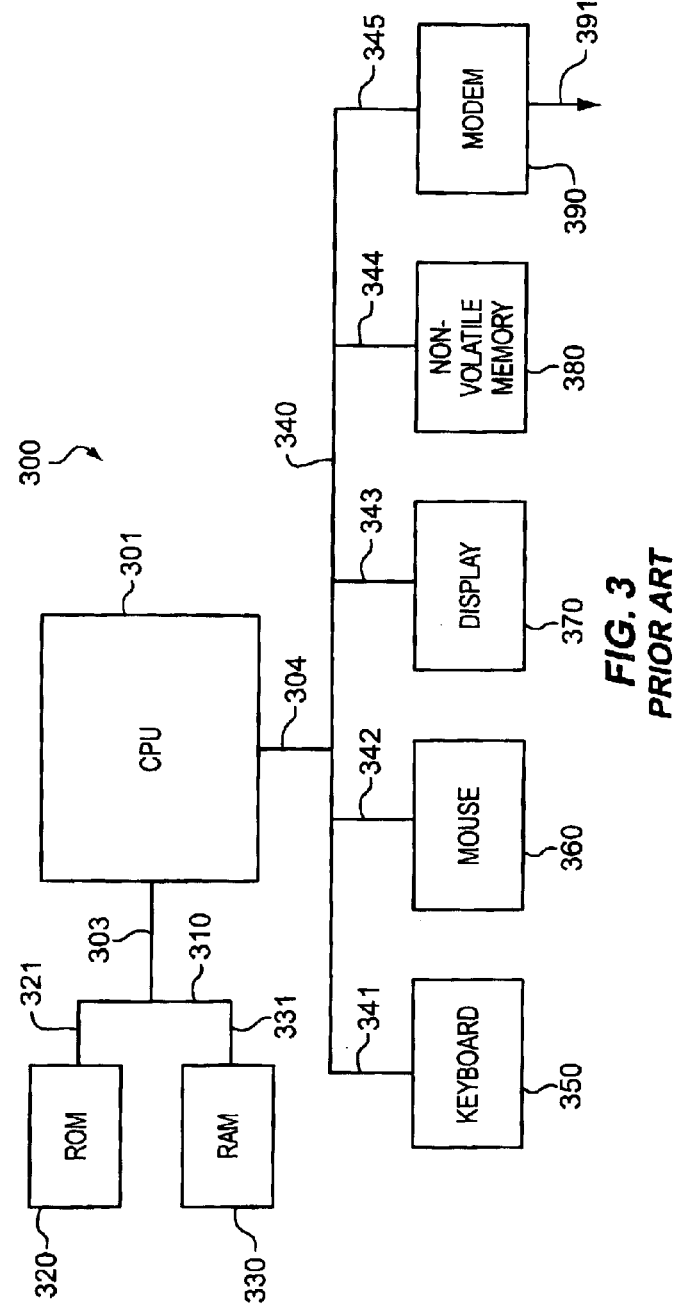
FIG. 3 illustrating an exemplary processing system.

FIG. 3 illustrates a block diagram of a processing system 300 that is exemplary of the computer systems such as remote client computer 210 and servers 250 and 230.

Processing system 300 includes central processing unit (CPU) 301 capable of executing instructions stored in a memory attached to CPU 301. CPU 301 is attached to a memory bus 310 via path 303. Memory bus 310 is connected to Read Only Memory (ROM) 320 via path 321 and to Random Access Memory (RAM) 330 via path 331. ROM 320 stores instructions used by CPU 301 to control the functions performed by processing system 300. RAM 330 stores instructions such as the operating system and currently running applications, to be executed by CPU 301 as well as the data needed to perform the instructions. CPU 301 reads and writes data to RAM 330 via path 331 and bus 310.

CPU 301 is connected to I/O bus 340 via path 304. I/O bus 340 connects CPU 301 to peripheral devices to transmit data between CPU 301 and the peripheral devices. In the preferred exemplary embodiment, the peripheral devices connected to I/O bus 340 include keyboard 350, mouse 360, display 370, nonvolatile memory (disk drive) 380, and modem 390. Keyboard 350 is connected to I/O bus 340 via path 341 and allows a user to input data. Mouse 360 is connected to I/O bus 340 via path 342 and allows a user to input data by moving mouse 360 to move an icon across display 370. Display 370 is a video monitor and associated drivers connected to I/O bus 340 via path 343 to display images to a user. Nonvolatile memory 380 is a disk drive which can read and write data to a disk or other type of media to store the data for future use and is connected to I/O bus 340 via path 344. Modem 390 is a device which facilitates a connection of processing system 300 to telephone line 391 for communication with other computers such as a server for an Internet connection. Modem 390 is connected to I/O bus 340 via path 345.

Process 400 is a process executed by a server to provide remote sizing and ordering of Coriolis flowmeters. Process 400 is a program written in a language such as Java or other language that facilitates communication between computers. Process 400 begins in step 405 by generating a display requesting flow stream parameters from a customer. The display may be a screen or page with fields to be filled by customer. In step 410, the server transmits the display to the client remote computer system.

In step 415, the server receives input flow stream parameters from a customer. The customer inputs the parameters into the remote computer which transmits the input flow stream parameters to the server.

Figure 5:
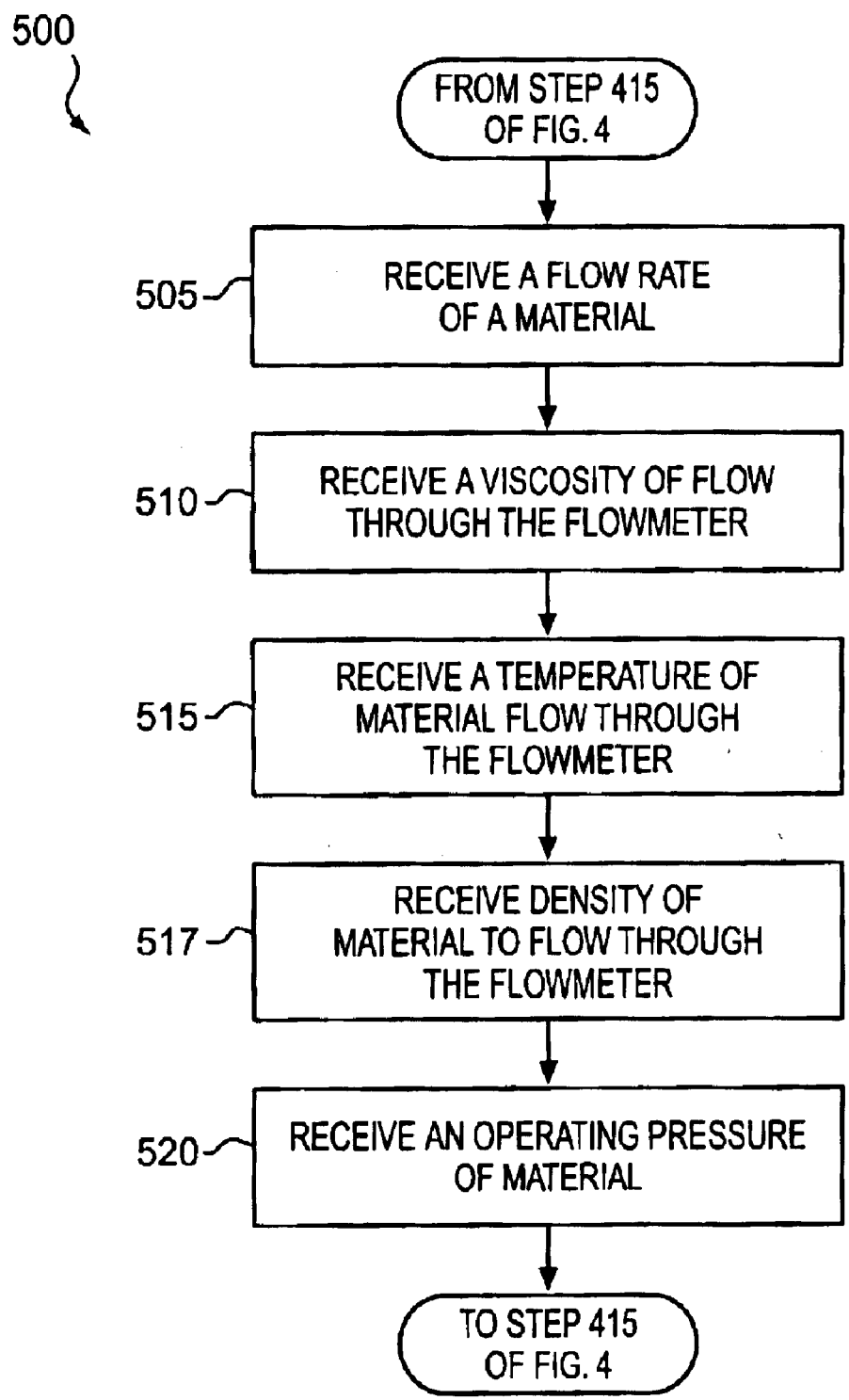
FIG. 5 illustrating an exemplary process of receiving input stream parameters.

FIG. 5 illustrates a process 500 for receiving input flow stream parameters. Process 500 begins in step 505 by receiving a flow rate of a material to flow through the flowmeter from a remote computer. In step 510, the server receives a viscosity of the material to flow through the flowmeter. The server then receives a temperature of the material to flow through the flowmeter in step 515. In step 517, the server receives a density of the material to flow through the flowmeter. Process 500 ends in step 520 in which the server receives an operating pressure of the material to flow through the flowmeter. One skilled in the art will know that other flow stream parameters may be added, but this is left to those skilled in the art.

Figure 4:
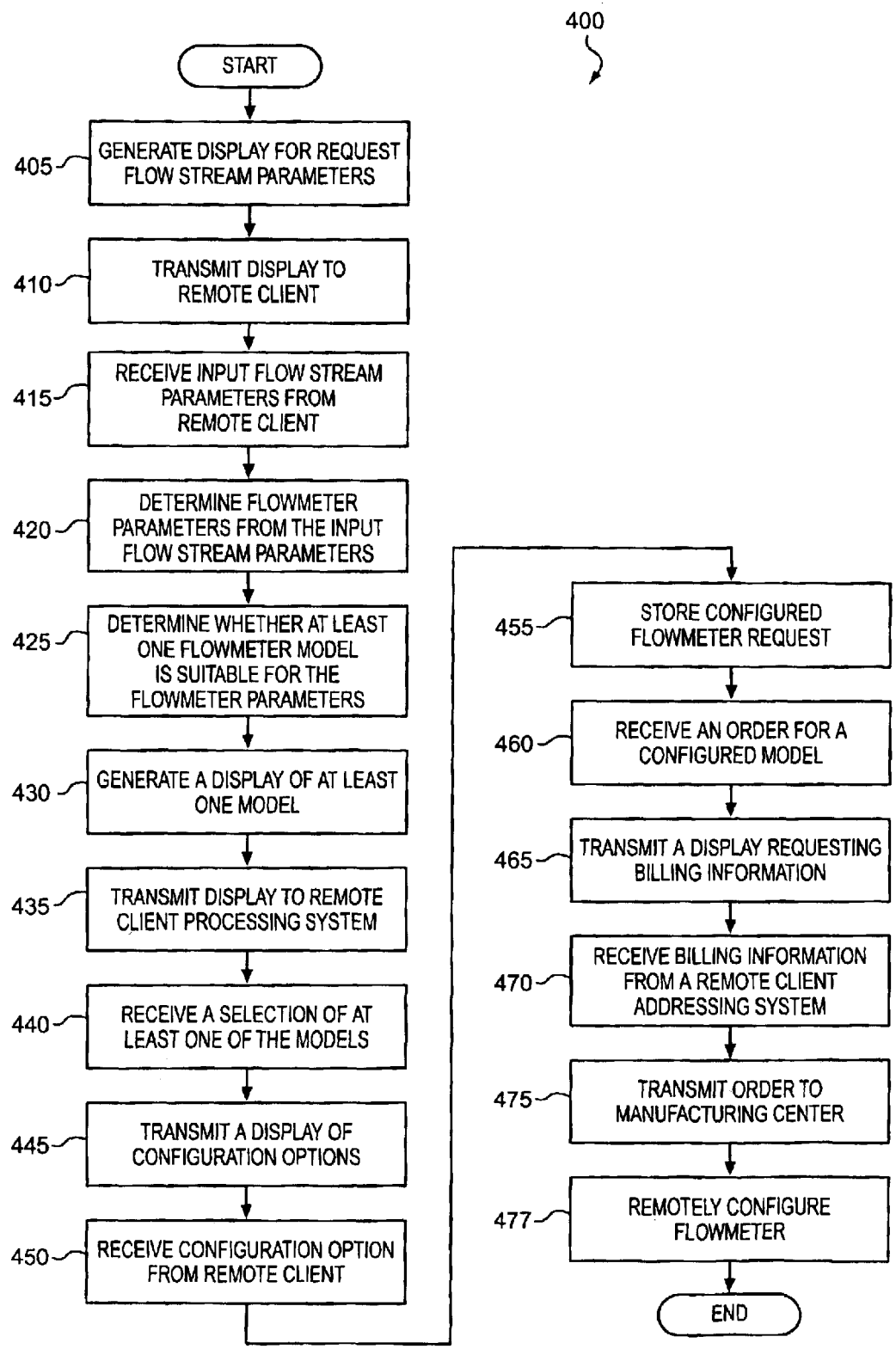
FIG. 4 illustrating an exemplary process of this invention.
Figure 6:
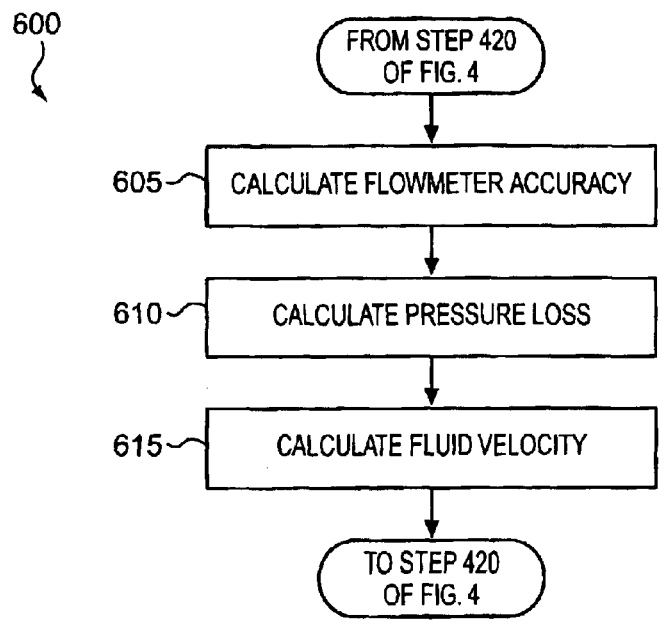
FIG. 6 illustrating an exemplary process of determining flowmeter parameters.

Referring back to FIG. 4, process 400 continues in step 420 by determining flowmeter parameters from the input flow stream parameters. FIG. 6 illustrates a process 600 executed by the server to calculate flowmeter parameters.

Process 600 begins in step 605 by calculating flowmeter accuracy for the input flow stream parameters. In step 610, the server calculates pressure loss of the flow across the flowmeter based upon the input flow stream parameters. In step 615, process 600 ends as the server calculates fluid velocity from the input flow stream parameters.

Referring back to FIG. 4, process 400 continues by determining at least one model of flowmeter that has tolerances acceptable for the determined flowmeter parameters in step 425. A display including all of the determined models is generated in step 430 and is transmitted to the remote client system in step 435. In step 440, the server receives a selection of one of the determined models.

Figure 7:
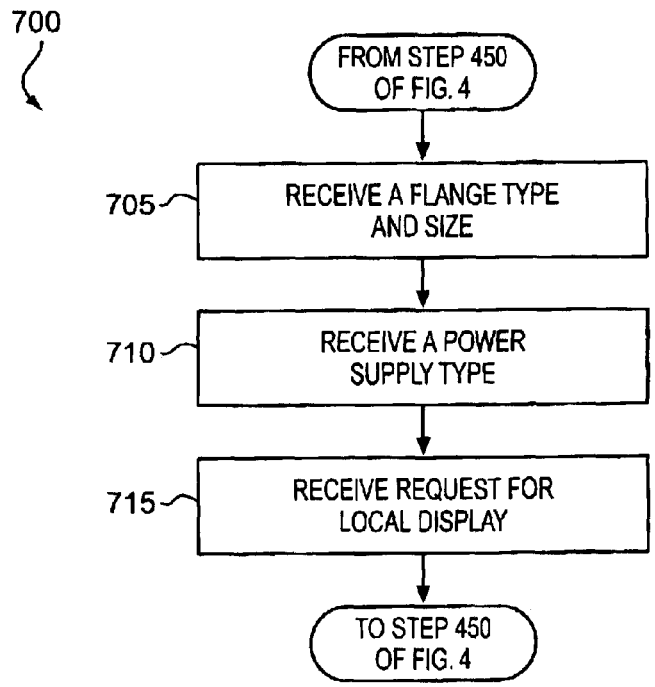
FIG. 7 illustrating an exemplary process of receiving configuration options.

In response to receiving the selection, the server transmits a display of configuration options to the remote client computer system in step 445. In step 450, the server receives configuration options from the customer via the remote client computer system. FIG. 7 illustrates an exemplary process 700 for receiving configuration options from the remote client computer.

Process 700 begins in step 705 by receiving a type and size of process connection. One skilled in the art will recognize that a process connection is a flange or other device used to connect the flowmeter into a pipeline. In step 710, the server receives a type of power supply to connect to the flowmeter. One skilled in the art will recognize that these may include either an (AC) or (DC) power supply and may supply any different ranges of currents. These are left to designers of flowmeters. Process 700 ends in step 715 with the server receiving a request for a local display. One skilled in the art will recognize that any of these configurations may be left out or others added depending upon the designer of the system.

Referring back to FIG. 4, process 400 continues in step 455 by storing a configured flowmeter in an electronic shopping cart. An electronic shopping cart is a database that stores configured flowmeters for a customer to choose from when making an order. It should be noted that steps 405 through 455 may be repeated any number of times by a user from almost any step in process 400 to design many different flowmeters for different uses and/or to order multiple flowmeters.

In step 460, the server receives an order for a configured flowmeter. This may be done by the user selecting one of the flowmeters stored in an electric shopping cart or may be received as the customer finishes configuring a flowmeter. In response to receiving an order, the server transmits a display requesting billing information from the customer in step 465. The request may be for a billing address, a credit card account or other form of creating and/or crediting an account.

In step 470, the server receives the billing information which is then stored for future use in billing. In step 475, the server transmits an order to a manufacturing department which will make the flowmeter and ship the flowmeter to the customer. The order may be transmitted in an e-mail message or other such manner that includes all of the configuration data for the flowmeter.

After the flowmeter is sent to the customer, the flowmeter may be remotely configured in step 477 by connecting a remote computer connected to the flowmeter to the server. Process 400 then ends.

What is claimed is:

1. A method for providing remote ordering of flowmeters, the method comprising the steps of:
   in a server,
      receiving input flow stream parameters over a network from customer, wherein said customer is remotely located from said server;
      determining flowmeter parameters from said input flow stream parameters;
      determining whether at least one flowmeter is suitable for said flowmeter parameters;
      transmitting information on said at least one flowmeter to said customer over said network;
      receiving over said network a selection of one of said at least one flowmeter by said customer;
      transmitting an order for said selected flowmeter; and
   after said customer receives said selected flowmeter, remotely configuring said selected flowmeter by connecting said selected flowmeter to said server over said network.

2. The method of claim 1 further comprising the steps of:
   in said server,
      transmitting configuration options to said customer over said network; and
      receiving at least one of said configuration options selected by said customer.

3. The method of claim 1 wherein said selected flowmeter comprises a Coriolis flowmeter.

4. The method of claim 1 further comprising the step of:
   in said server,
      transmitting a request for said input flow stream parameters over said network to said customer.

5. The method of claim 1 further comprising the step of:
   in said server, logging in said customer.

6. The method of claim 1 wherein said step of transmitting an order for said selected flowmeter comprises the step of:
   transmitting said order to a manufacturing department for flowmeters.

7. The method of claim 1 wherein said step of transmitting an order for said selected flowmeter comprises the steps of:
   generating an e-mail of said order.

8. The method of claim 1 wherein said network comprises the internet.

9. The method of claim 1 further comprising the step of:
   in said server,
      transmitting a request for billing information to said customer aver said network responsive to said order; and
      receiving said billing information from said customer over said network.

10. A product for providing remote ordering of flowmeters, the product comprising:
    instructions;
    a memory configured to store said instructions; and
    a processing unit configured to execute said instructions;
    said instructions configured to direct said processing unit to:
       receive input flow stream parameters over a network from a customer that is remotely located from said product,
       determine flowmeter parameters from said input flow stream parameters,
       determine whether at least one flowmeter is suitable for said flowmeter parameters,
       transmit over said network information on said at least one flowmeter to said customer,
       receive a selection of one of said at least one flowmeter by said customer over said network,
       transmit an order for said selected flowmeter, and
       remotely configure said selected flowmeter when said selected flowmeter is connected over said network.

11. The product of claim 10 wherein said instructions direct said processing unit to:
    transmit configuration options to said customer over said network; and
    receive at least one of said configuration options selected by said customer.

12. The product of claim 10 wherein said selected flowmeter comprises a Coriolis flowmeter.

13. The product of claim 10 wherein said instructions direct said processing unit to:
    transmit a request for said input flow stream parameters over said network to said customer.

14. The product of claim 10 wherein said instructions direct said processing unit to:
    log in said customer.

15. The product of claim 10 wherein said instructions direct said processing unit to:
    transmit said order to a manufacturing department for flowmeters.

16. The product of claim 10 wherein said instructions direct said processing unit to:
    generate an e-mail of said order.

17. The product of claim 10 wherein said network comprises the Internet.

18. The product of claim 10 wherein said instructions direct said processing unit to:
    transmit a request for billing information to said customer over said network responsive to said order; and
    receive said billing information from said customer over said network.

* * * * *

UNITED STATES PATENT AND TRADEMARK OFFICE
CERTIFICATE OF CORRECTION

PATENT NO. : 6,768,950 B2  
DATED : July 27, 2004  
INVENTOR(S) : John R. Bugarin and James F. Mackin, III It is certified that error appears in the above-identified patent and that said Letters Patent is hereby corrected as shown below:

Column 7,  
Line 48, change ";" to -- : --.

Column 8,  
Line 2, change "aver" to -- over --;  
Line 23, change "," to -- ; --.

Signed and Sealed this

First Day of February, 2005

JON W. DUDAS  
*Director of the United States Patent and Trademark Office*